(12) United States Patent
Amirparviz

(10) Patent No.: US 8,666,212 B1
(45) Date of Patent: Mar. 4, 2014

(54) HEAD MOUNTED DISPLAY USING A FUSED FIBER BUNDLE

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/345,149

(22) Filed: Jan. 6, 2012

Related U.S. Application Data

(60) Provisional application No. 61/480,141, filed on Apr. 28, 2011.

(51) Int. Cl.
*G02B 6/06* (2006.01)
*G02B 6/04* (2006.01)

(52) U.S. Cl.
USPC ............ 385/119; 385/115; 385/116; 385/121

(58) Field of Classification Search
USPC .................................................. 385/115, 119
See application file for complete search history.

(56) References Cited

U.S. PATENT DOCUMENTS

| | | | |
|---|---|---|---|
| 3,432,219 A | 3/1969 | Shenker et al. |
| 3,443,858 A | 5/1969 | La Russa |
| 4,153,913 A | 5/1979 | Swift |
| 4,743,200 A | 5/1988 | Welch et al. |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,926,318 A | 7/1999 | Hebert |
| 5,943,171 A | 8/1999 | Budd et al. |

(Continued)

FOREIGN PATENT DOCUMENTS

| | | |
|---|---|---|
| GB | 2272980 A | 6/1994 |
| WO | WO96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Ryan Lepisto
(74) *Attorney, Agent, or Firm* — Blakely Sokoloff Taylor & Zafman LLP

(57) ABSTRACT

An optical apparatus of a head mounted display includes a fused fiber bundle, an image source, and an image lens. The fused fiber bundle includes an array of fused optical fibers having an in-coupling surface located at a first end and an out-coupling surface physically facing an eye-ward direction and located at a second end. The fused fiber bundle is tapered such that the in-coupling surface has a larger surface area than the out-coupling surface to compress the light image. The image source is disposed at the first end of the fused fiber bundle and optically aligned with the in-coupling surface to launch the light image into the fused fiber bundle. The image lens is disposed at the second end and optically aligned with the out-coupling surface to focus the light image emitted from the second end towards an eye when the head mounted display is worn.

20 Claims, 6 Drawing Sheets

(56) References Cited

U.S. PATENT DOCUMENTS

| | | | |
|---|---|---|---|
| 5,949,583 | A | 9/1999 | Rallison et al. |
| 6,023,372 | A | 2/2000 | Spitzer et al. |
| 6,057,966 | A * | 5/2000 | Carroll et al. ............ 359/630 |
| 6,091,546 | A | 7/2000 | Spitzer |
| 6,172,657 | B1 | 1/2001 | Kamakura et al. |
| 6,201,629 | B1 | 3/2001 | McClelland et al. |
| 6,204,974 | B1 | 3/2001 | Spitzer |
| 6,222,677 | B1 | 4/2001 | Budd et al. |
| 6,349,001 | B1 | 2/2002 | Spitzer |
| 6,353,492 | B2 | 3/2002 | McClelland et al. |
| 6,353,503 | B1 | 3/2002 | Spitzer et al. |
| 6,356,392 | B1 | 3/2002 | Spitzer |
| 6,384,982 | B1 | 5/2002 | Spitzer |
| 6,538,799 | B2 | 3/2003 | McClelland et al. |
| 6,618,099 | B1 | 9/2003 | Spitzer |
| 6,690,516 | B2 | 2/2004 | Aritake et al. |
| 6,701,038 | B2 | 3/2004 | Rensing et al. |
| 6,724,354 | B1 | 4/2004 | Spitzer |
| 6,738,535 | B2 | 5/2004 | Kanevsky et al. |
| 6,747,611 | B1 | 6/2004 | Budd et al. |
| 6,829,095 | B2 | 12/2004 | Amitai |
| 6,879,443 | B2 | 4/2005 | Spitzer et al. |
| 7,158,096 | B1 | 1/2007 | Spitzer |
| 7,177,083 | B2 * | 2/2007 | Holler ............ 359/630 |
| 7,242,527 | B2 | 7/2007 | Spitzer et al. |
| 7,391,573 | B2 | 6/2008 | Amitai |
| 7,457,040 | B2 | 11/2008 | Amitai |
| 7,576,916 | B2 | 8/2009 | Amitai |
| 7,577,326 | B2 | 8/2009 | Amitai |
| 7,643,214 | B2 | 1/2010 | Amitai |
| 7,663,805 | B2 | 2/2010 | Zaloum et al. |
| 7,672,055 | B2 | 3/2010 | Amitai |
| 7,724,441 | B2 | 5/2010 | Amitai |
| 7,724,442 | B2 | 5/2010 | Amitai |
| 7,724,443 | B2 | 5/2010 | Amitai |
| 7,843,403 | B2 | 11/2010 | Spitzer |
| 7,900,068 | B2 | 3/2011 | Weststrate et al. |
| 8,004,765 | B2 | 8/2011 | Amitai |
| 2001/0031115 | A1 * | 10/2001 | Chen et al. ............ 385/54 |
| 2003/0090439 | A1 | 5/2003 | Spitzer et al. |
| 2005/0174651 | A1 | 8/2005 | Spitzer et al. |
| 2006/0192306 | A1 | 8/2006 | Giller et al. |
| 2006/0192307 | A1 | 8/2006 | Giller et al. |
| 2006/0204186 | A1 * | 9/2006 | Tammela et al. ............ 385/95 |
| 2008/0219025 | A1 | 9/2008 | Spitzer et al. |
| 2009/0122414 | A1 | 5/2009 | Amitai |
| 2010/0046070 | A1 | 2/2010 | Mukawa |
| 2010/0103078 | A1 | 4/2010 | Mukawa et al. |
| 2010/0149073 | A1 | 6/2010 | Chaum et al. |
| 2010/0278480 | A1 | 11/2010 | Vasylyev |
| 2011/0213664 | A1 | 9/2011 | Osterhout et al. |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

HEAD MOUNTED DISPLAY USING A FUSED FIBER BUNDLE

CROSS-REFERENCE TO RELATED APPLICATIONS

This application claims the benefit of U.S. Provisional Application No. 61/480,141 filed on Apr. 28, 2011, the contents of which are incorporated herein by reference.

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implemented existing HMDs.

SUMMARY

Implementations of techniques, apparatuses, and systems are provided for an optical apparatus of a head mounted display. In one aspect, the optical apparatus includes a fused fiber bundle, an image source, and an image lens. The fused fiber bundle includes an array of fused optical fibers having an in-coupling surface located at a first end and an out-coupling surface physically facing an eye-ward direction and located at a second end. The fused fiber bundle is tapered such that the in-coupling surface has a larger surface area than the out-coupling surface to compress the light image. The image source generates the light image. The image source is disposed at the first end of the fused fiber bundle and optically aligned with the in-coupling surface to launch the light image into the fused fiber bundle. The image lens is disposed at the second end of the fused fiber bundle and optically aligned with the out-coupling surface to focus the light image emitted from the second end towards an eye when the head mounted display is worn.

In another aspect, a head mounted display including a pair of optical systems is provided. Each of the optical systems includes a fused fiber bundle including an array of fused optical fibers having an in-coupling surface located at a first end for receiving a light image and an out-coupling surface locating at a second end for emitting the light image, wherein the fused fiber bundle is tapered such that the in-coupling surface has a larger surface area than the out-coupling surface; an image lens disposed at the second end of the fused fiber bundle and optically aligned with the out-coupling surface to focus the light image emitted from the second end; and an image source for generating the light image and disposed at the first end of the fused fiber bundle and optically aligned with the in-coupling surface to launch the light image into the fused fiber bundle. The head mounted display further includes a frame assembly to support the pair of optical systems for wearing on a head of a user such that the out-coupling surface of each of the optical systems physically faces an eye-ward direction when the head mounted display is worn by the user.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, system and technique for a head mounted display ("HMD") using a fused fiber bundle to transport an image in-front of the eye are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
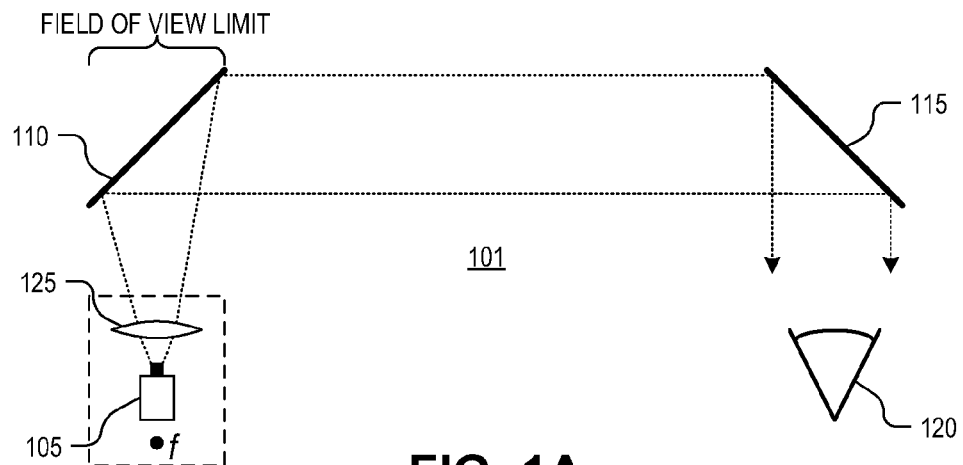
FIG. 1A illustrates a first conventional near-to-eye optical system using an input lens and two minors.

FIG. 1A illustrates a first conventional near-to-eye optical system 101 using an input lens and two minors. An image source 105 outputs an image that is reflected by two minors 110 and 115, which form an image near to eye 120. Image source 105 is typically mounted above the head or to the side of the head, while minors 110 and 115 bend the image around the front of the viewer's face to their eye 120. Since the human eye is typically incapable of focusing on objects placed within a few centimeters, this system requires a lens 125 interposed between the first minor 110 and image source 105. Lens 125 creates a virtual image that is displaced further back from the eye than the actual location of minor 115 by positioning image source 105 inside of the focal point f of lens 125. Optical system 101 suffers from a relatively small field of view (e.g., approximately 20 degrees) limited by the extent of mirrors 110 and 115 and the bulkiness of lens 125. The field of view can be marginally improved by placing minors 110 and 115 within a high index material to compress the angles of incidence, but is still very limited and the thickness of the waveguide rapidly increases to achieve larger fields of view.

Figure 1B:
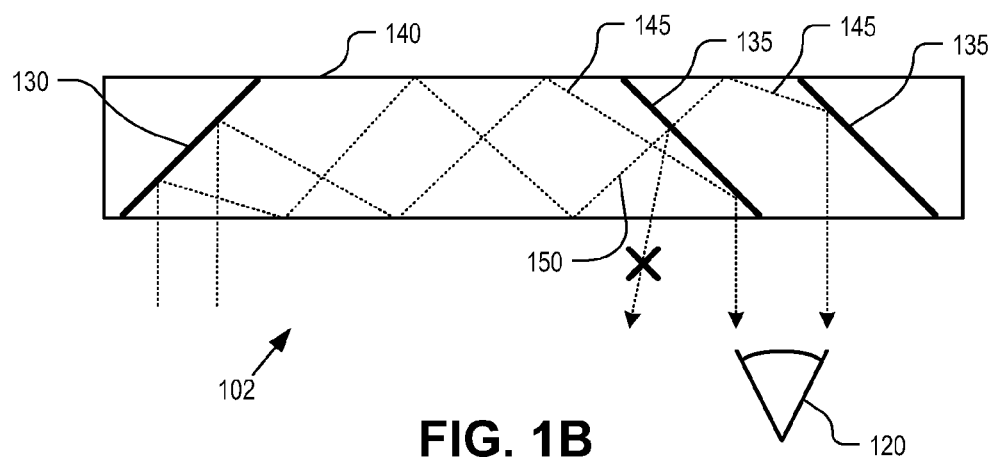
FIG. 1B illustrates a second conventional near-to-eye optical system using angle sensitive dichroic minors.

FIG. 1B illustrates a second conventional near-to-eye optical system 102 using angle sensitive dichroic minors. Optical system 102 includes a single in-coupling minor 130 and two out-coupling dichroic mirrors 135 disposed within a waveguide 140. This system uses collimated input light from virtual images placed at infinity. In order to produce a useful image at eye 120, each incident angle of input light should correspond to a single output angle of emitted light. Since light can potentially reflect off of output minors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 135 that passes some incident angles while reflecting others limits the field of view optical system 102 and the dichroic minor coating does not provide sharp angular cutoffs, resulting in ghosting effects.

Figure 1C:
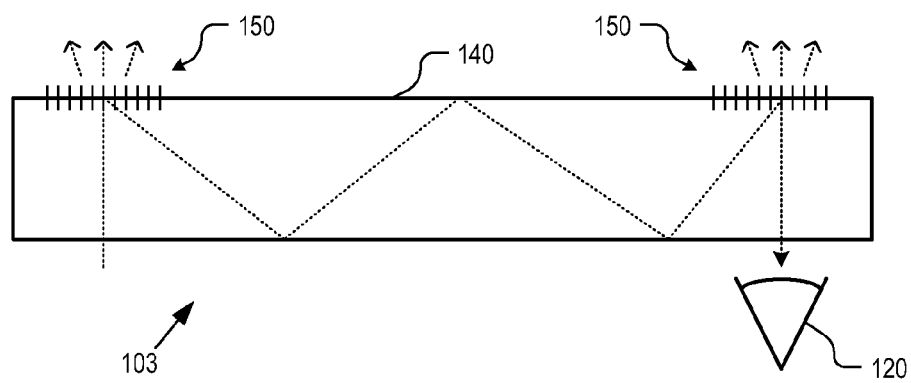
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of minors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly. Again, optical system 103 suffers from a limited field of view.

A head mounted display ("HMD") system should generate in-focus images from components that are place in-front of and near to the eye. In order to reduce the impact of these components on normal vision, the size and footprint of these components should be reduced. This calls for generating the image at a place different from the front of the eye and then moving the image to a location that will make it visible to the eye. As discussed above in connection with FIG. 1A, conventional techniques used to move the image, such are mirrors, make the optical system of a HMD bulky and uncomfortable. The techniques disclosed herein use a group of fused fibers (fused fiber bundle) to move the image to a location in-front of the eye while maintaining a compact, comfortable, and less intrusive design.

Figure 2:
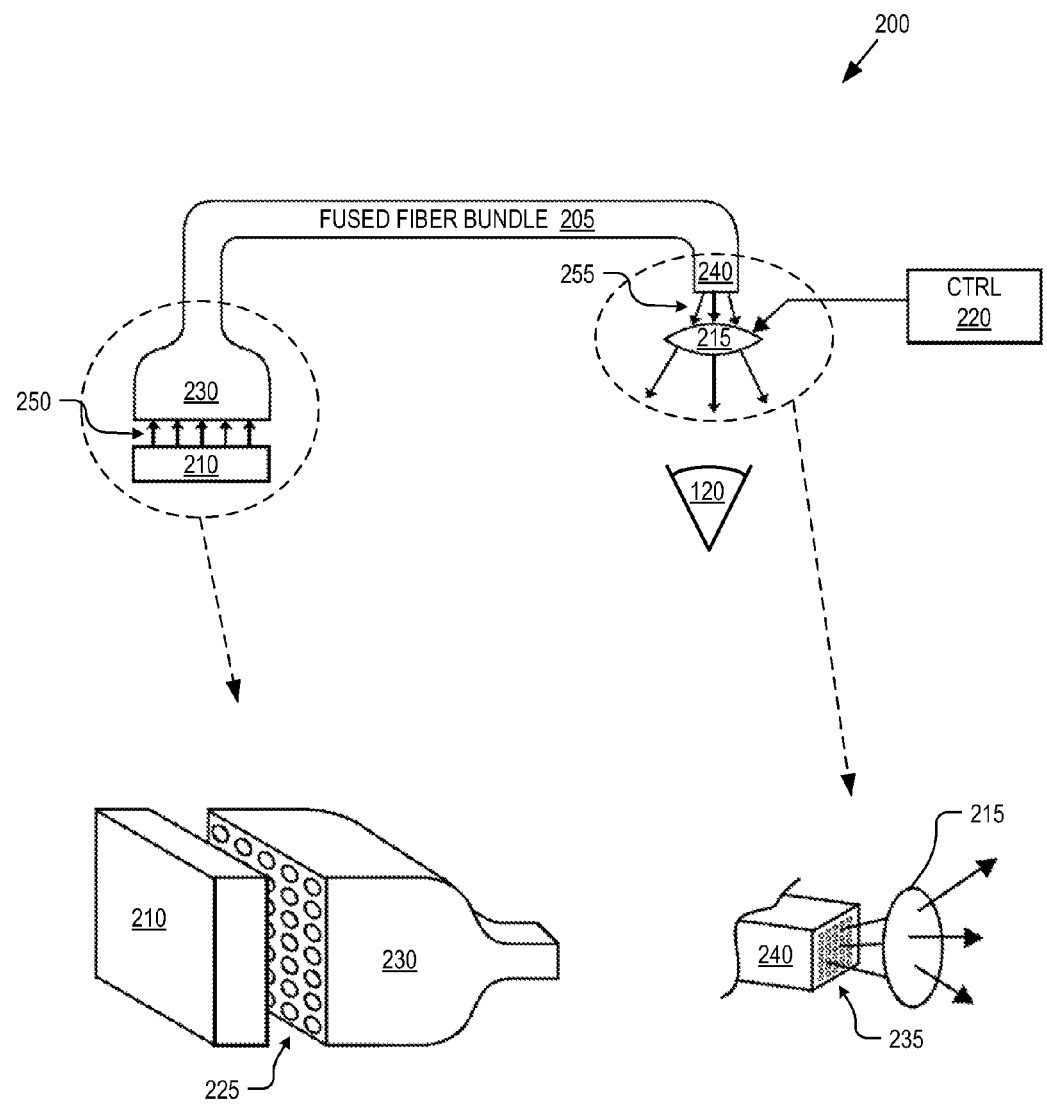
FIG. 2 is a functional block diagram of a near-to-eye optical system implemented with a fused fiber bundle for use with a head mounted display, in accordance with an embodiment of the invention.

FIG. 2 is a functional block diagram of a near-to-eye optical system 200 for use in a HMD, in accordance with an embodiment of the invention. The illustrated near-to-eye optical system 200 includes a fused fiber bundle 205, an image source 210, an image lens 215, and a controller 220. The illustrated embodiment of fused fiber bundle 205 includes an in-coupling surface 225 at a first end 230 and an out-coupling surface 235 at a second end 240.

Fused fiber bundle 205 includes an array of individual optical fibers fused together into a rigid bundle. In the illustrated embodiment, fused fiber bundle 205 is physically drawn during fabrication to taper its cross-section such that in-coupling surface 225 has a larger surface area than out-coupling surface 235. Tapering fused fiber bundle 205 not only reduces the overall cross-sectional size of fused fiber bundle 205, but also tapers the cross-sections of the individual fibers within the bundle. Tapering fused fiber bundle 205 serves a number of functions. Tapering fused fiber bundle 205 compresses light image 250 emitted from light source 210. Optical system 200 is well suited for use in an HMD, since the second end 240, which is positioned in front of eye 120 has a reduced blind spot when looking past optical system 200 to perceive the real-world. The reduced cross-section of the individual fibers within fused fiber bundle 205 can create increased diffractive effects that increase the divergence angle of compressed light image 255 emitted from out-coupling surface 235. The increased emission divergence results in an improved field of view. In some embodiments, out-coupling surface 235 is ion milled to roughen the emission surface of each individual optical fiber to further increase emission divergence.

Fused fiber bundle 205 may assume a variety of sizes, shapes, and lengths; however, when used in connection with an HMD, it may be used to transport light image 250 from a source location adjacent to eye 120 (out of the eye's field of view) to a location in front of eye 120. In one embodiment, fused fiber bundle 205 may include an array of 500×500 individual fibers with in-coupling surface 225 having an area of approximately 5 mm by 5 mm and out-coupling surface 235 having an area of approximately 2 mm by 2 mm. Thus, fused fiber bundle 205 may be tapered to compress light image 250 by greater than 50% when emitted. Of course, other embodiments may include other dimensions and numbers of individual fibers and provide greater or less image compression via physical tapering. Although in-coupling surface 225 and out-coupling surface 235 are illustrated as having rectangular cross-section shapes, fused fiber bundle 205 may rigidly fuse optical fibers into other cross-sectional array shapes, such as squares, circles, ovals, or otherwise.

Image source 210, may be implemented using a variety of image generation devices. For example, image source 210 may be implemented by an organic light emitting diode ("LED") panel or transmissive liquid crystal display ("LCD")

panel. These panel image sources can be positioned in close, intimate contact with in-coupling surface 225. In one embodiment, image source 210 has an emission aperture that has substantially the same size and profile shape as in-coupling surface 225 and is optically aligned and physically abutted to in-coupling surface 225 and secured in place. In these abutted configurations, intermediate optics between the emission aperture of image source 210 and in-coupling surface 225 may not be used. In one embodiment, fused fiber bundle 205 has a number of individual optical fibers that matches a pixel count of image source 210, an may even have a one-to-one correspondence and alignment between pixels and individual fibers. In alternative embodiments, image source 210 may be implemented with a liquid crystal on silicon ("LCOS") panel or a micro-minor image panel. In these alternative embodiments, intermediary optics may be positioned between image source 210 and in-coupling surface 225 to focus and direct light image into fused fiber bundle 205 at the first end 230. In either case, light image 250 will typically be in-focus on the plane of in-coupling surface 225.

In the illustrated embodiment, image lens 215 is positioned in front of, but displaced back from, out-coupling surface 235 near the second end 240 to bring the compressed light image 255 into focus for a near-to-eye configuration. Since out-coupling surface 235 physically faces the eye-ward direction, image lens 215 is physically and optically aligned between eye 120 and out-coupling surface 235. Typically, bringing light image 255 into focus for a near-to-eye configuration requires virtually displacing the image further back from the eye so that the virtual image can be brought into focus without great strain. In some embodiments, the virtual image can even be displaced near to infinity, though any distance upon which the human eye can comfortably focus may work as well.

In one embodiment, image lens 215 is an electrically controlled variable lens. In a variable lens embodiment, controller 220 may be coupled to image lens 215 to manipulate zoom/focus features of the lens. In some embodiments, virtual zoom may may be a static configuration set at the factory or during an initialization phase. In other embodiments, the virtual zoom may be dynamically controlled during operation so that computer generated images ("CGI") can be dynamically moved between the background and the foreground.

Image lens 215 may be implemented using various mini-lens technologies, such as a voice coil variable lens, a liquid crystal lens, or otherwise. For the sake of illustration, out-coupling surface 235 may be 2 mm by 2 mm, while image lens 215 may have a diameter of approximately 1.2 cm. Of course, other dimensions larger or smaller for both the out-coupling surface 235 and image lens 215 may be used as well.

Figure 3:
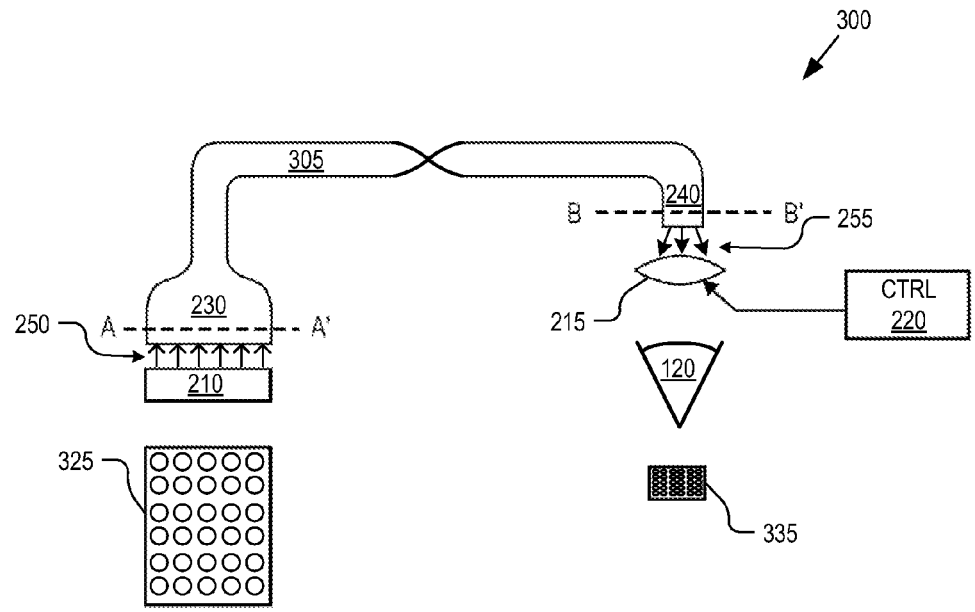
FIG. 3 is a functional block diagram of a near-to-eye optical system implemented with a fused fiber bundle that rotates image orientation, in accordance with an embodiment of the invention.

FIG. 3 is a functional block diagram of a near-to-eye optical system 300 implemented with a fused fiber bundle 305 that rotates image orientation, in accordance with an embodiment of the invention. Optical system 300 is similar to optical system 200 except that fused fiber bundle 305 twists or rotates at an intermediate point between the first end 230 and the second end 240. The intermediate twisting of fused fiber bundle 305 enables rotating the orientation of compressed light image 255 relative to the input light image 250. For example, in-coupling surface 325 may have a portrait orientation (aspect ratio), while out-coupling surface 335 may have a landscape orientation, or vice versa. Thus, fused fiber bundle 305 can be twisted by virtually any selectable amount such that cross-section B-B' is rotated by any desired amount (e.g., 30 degrees, 45 degrees, 90 degrees, etc.) relative to cross-section A-A'. This rotation not only can be used to change aspect ratios, but also provides industrial design flexibility by loosening the constraints on how and where image source 210 is mounted.

Figure 4:
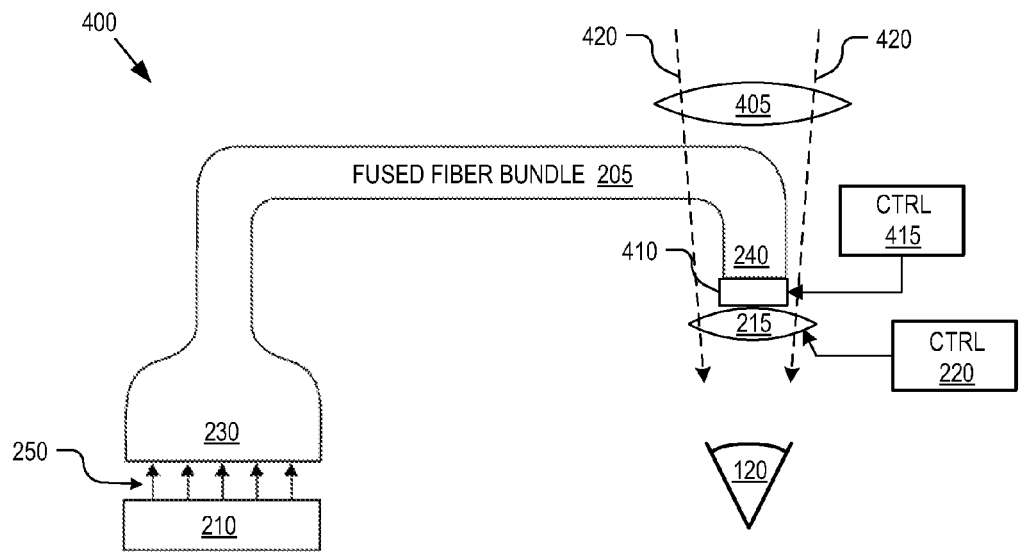
FIG. 4 is a functional block diagram of a near-to-eye optical system including a complementary lens to reduce real-world view obstructions, in accordance with an embodiment of the invention.

FIG. 4 is a functional block diagram of a near-to-eye optical system 400, in accordance with an embodiment of the invention. Optical system 400 is similar to optical system 200, but includes additional optional features. These features include a complementary lens 405, a refractive material zone 410, and a controller 415. Complementary lens 405 and refractive material zone 410 may be included independent of each other.

Complementary lens 405 is positioned opposite to image lens 215 with out-coupling surface 235 at second end 240 disposed in between. Complementary lens 405 includes optical properties that reverse optical properties of image lens 215 to reduce a blind spot size associated with image lens 215. Image lens 215 focuses compressed light image 255 onto eye 120 by placing its focal point near out-coupling surface 235. However, external light 420 originating from behind fused fiber bundle 205 is not only blocked by fused fiber bundle 205 itself but distorted by image lens 215. Thus, complementary lens 405 is positioned to counter the effects image lens 215 has on external light 420, such that the blind spot size is reduced to just the profile of fused fiber bundle 205 itself. However, in a binocular HMD incorporating optical system 400, even the profile blind spot associated with fused fiber bundle 205 will be naturally compensated by the brain merging the external world view images originating from the left and right eyes.

Refractive material zone 410 is disposed between out-coupling surface 235 and image lens 215. Refractive material zone 410 may be made of a refractive material (liquid or solid) having a refractive index different than air. Refractive material zone 410 can be used to adjust or otherwise affect the field of view of light image 255 emitted from out-coupling surface 235. In one embodiment, refractive material zone 410 is a static refractive material selected by design to achieve a desired image divergence prior to light image 255 reaching image lens 215. In a static index embodiment, controller 415 is not used. For example, various index matching liquids/adhesives available from Norland Products, Inc. of Cranbury, New Jersey may be used. In another embodiment, refractive material zone 410 may be implemented with a material having a electro-actively controlled index facilitating dynamic adjustments of the field of view. In a electro-actively controlled index embodiment, controller 415 is coupled to refractive material zone 410 to adjust its index of refraction and thereby change the field of view of light image 255.

Figure 5:
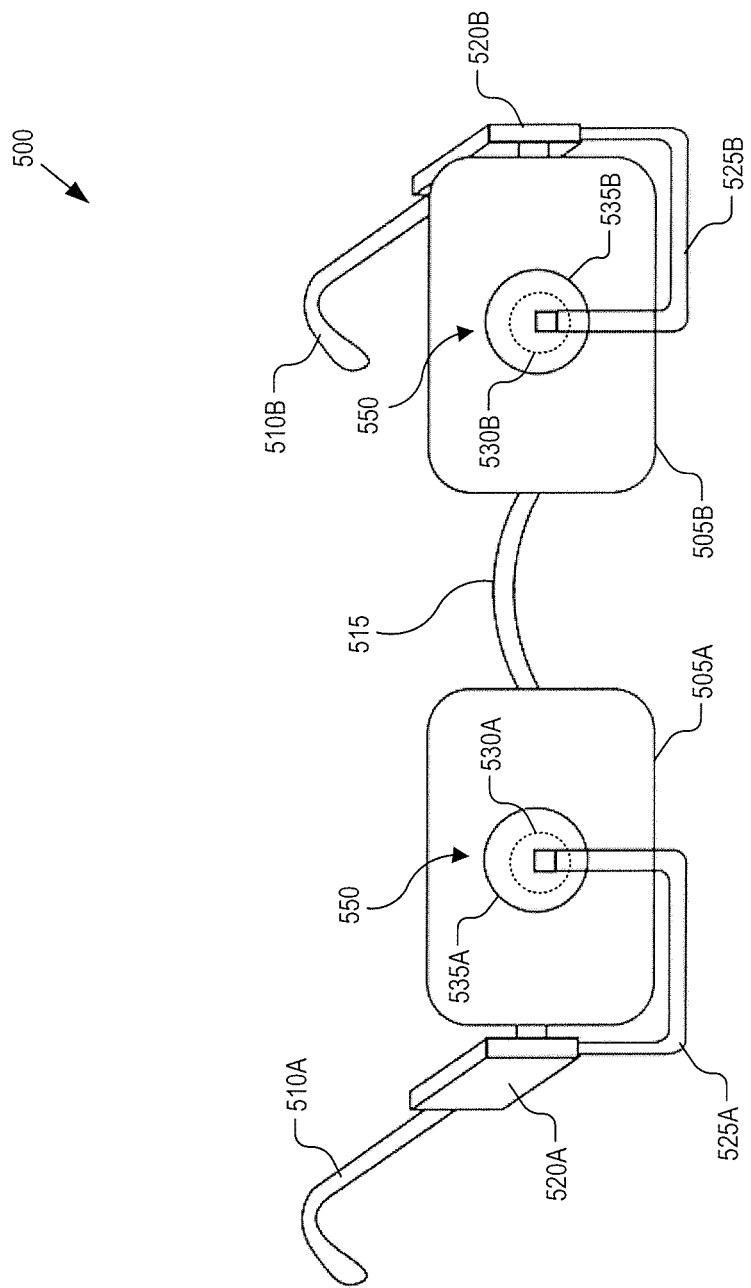
FIG. 5 is a perspective view of a head mounted display using two fused fiber bundles to deliver near-to-eye images, in accordance with an embodiment of the invention.
Figure 6:
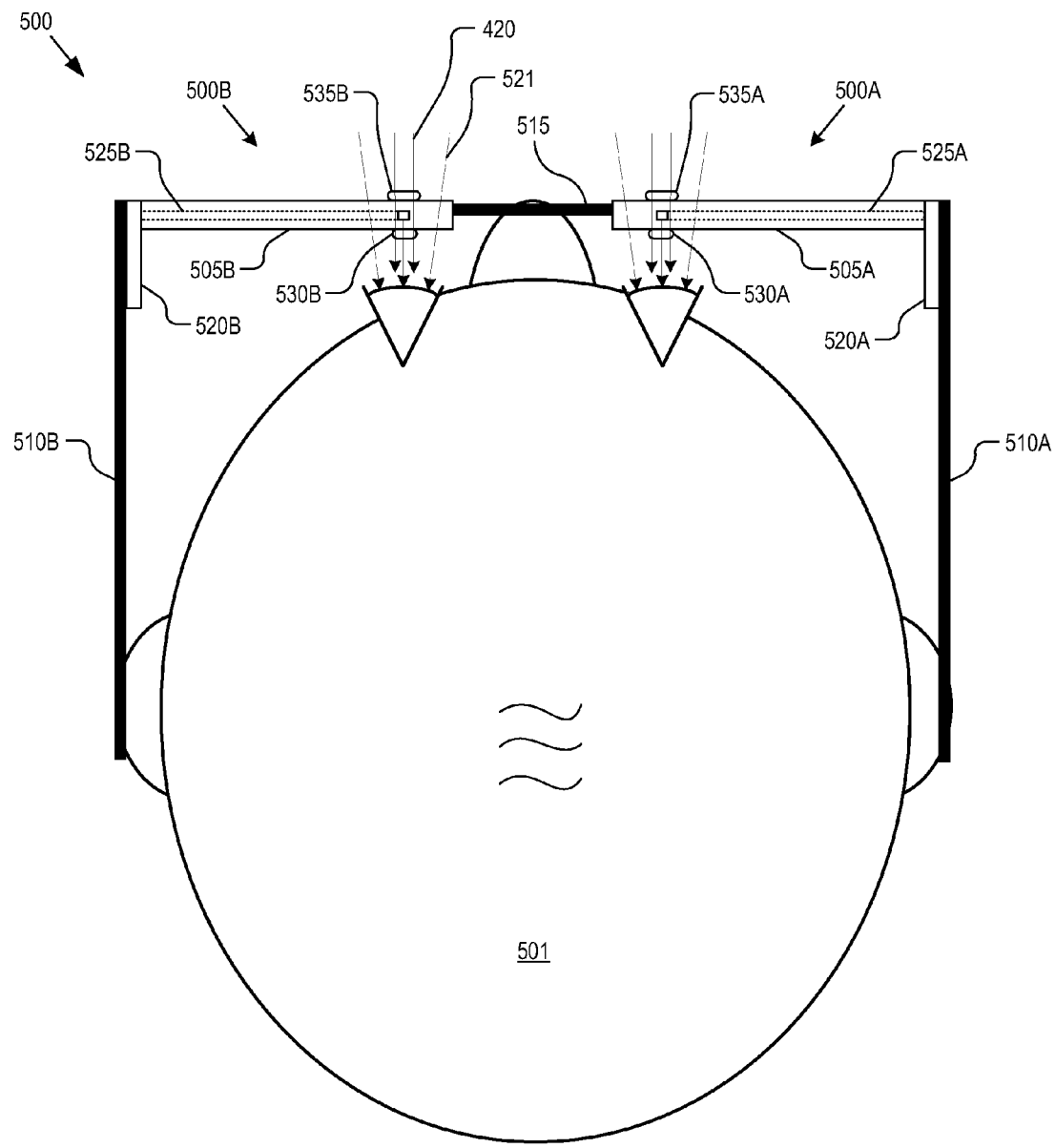
FIG. 6 is a top view of a head mounted display using two fused fiber bundles to deliver near-to-eye images to a user, in accordance with an embodiment of the invention.

FIG. 5 is a perspective view of an HMD 500 using two fused fiber bundles to deliver near-to-eye images, in accordance with an embodiment of the invention. FIG. 6 is a top view of HMD 500 when worn by a user 501, in accordance with an embodiment of the invention. The illustrated embodiment of HMD 500 includes a frame assembly, lens regions 505A and 505B, and a pair of optical systems. The illustrated embodiment of the frame assembly includes ear members 510A and 510B and a nose bridge 515. The illustrated embodiment of the pair of optical systems includes image sources 520A and 520B, fused fiber bundles 525A and 525B, image lenses 530A and 530B, and complementary lenses 535A and 535B. Although FIGS. 5 & 6 illustrate a specific embodiment for each optical system, it should be appreciated that each of the optical systems illustrated in FIGS. 5 & 6 may be implemented with any of the optical systems disclosed above, including any of optical systems 200, 300, or 400, or some combination thereof.

The two optically systems are secured to the frame assembly to form an eye glass arrangement that can be worn on the head of user 501. The ear members 505 rest over the user's ears while nose bridge 515 rests over the user's nose. The frame assembly is shaped and sized to position out-coupling surface 235 of each optical system in front of a corresponding eye 120 of user 501 with out-coupling surface 235 facing the eye-ward direction.

Fused fiber bundles 525 can be made to conform to a variety of different paths having a variety of different angled bends or twists. In the illustrated embodiment, fused fiber bundles 525 are routed along a lower periphery of lens regions 505 so as to reduce or minimize their visual obstruction of external light reaching eyes 120 before bending by approximately 90 degrees to cross into lens regions 505 to reach a central location 550 located in front of each eye 120. At central location 550 fused fiber bundles 525 again bend by approximately 90 degrees so that out-coupling surface 235 (or 335) faces the eye-ward direction.

Although FIG. 5 illustrates fused fiber bundles 525 being routed about the lower periphery of lens regions 505, in other embodiments fused fiber bundles 525 may routed about the upper periphery of lens regions 505, through a middle of lens regions 505, or otherwise. Since fused fiber bundles 525 are rigid structures, they may even be used as a structural member of the frame assembly to hold glasses or a clear substrate at lens regions 505. Fused fiber bundles 525 may be routed along a perimeter or exterior surface of a glass substrate material forming lens regions 505 or even embedded/routed within the glass substrate material.

The illustrated embodiment of HMD 500 is capable of displaying a heads-up display to user 501. As such, each lens region 505 is transparent or partially transparent (e.g., clear substrate) and permits the user to see a real world image via external light 420 and 521. Right and left CGIs (in a binocular embodiment) are generated by image sources 520A and 520B, respectively. The CGI output by image sources 520 is launched into their respective fused fiber bundles 525 at in-coupling surfaces 225 and emitted from out-coupling surfaces 235 (or 335) near-to-eyes 120. Since the human eye is typically incapable of bring objects within a few centimeters into focus, image lenses 530 virtually displace light image 255 further back or even at or near infinity. The CGI is seen by the user as a virtual image embedded in their real world view.

Figure 7A:
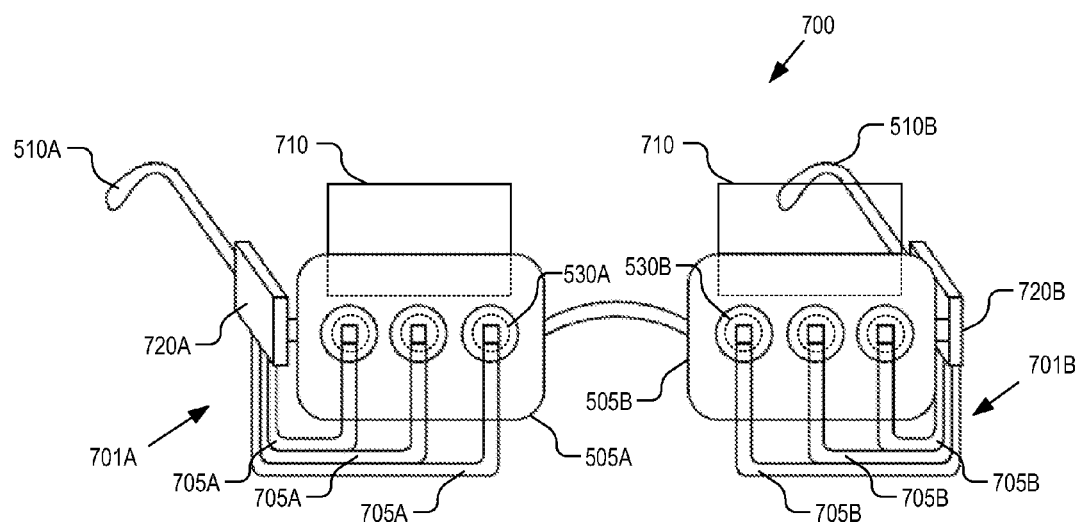
FIG. 7A is a perspective view of a head mounted display using multi-split fused fiber bundles to deliver near-to-eye images, in accordance with an embodiment of the invention.

FIG. 7A is a perspective view of an HMD 700 using multi-split fused fiber bundles 701A and 701B to deliver near-to-eye images, in accordance with an embodiment of the invention. HMD 700 is similar to HMD 500 except that each multi-split fused fiber bundle 701A or 701B includes multiple fused fiber bundles 705A or 705B, respectively. Each fused fiber bundle 705 may separate at a different location from the bundle group and physically route to a different location within a lens region 505. Each fused fiber bundle 705A (or 705B) carries a copy of the same light image to a different location within a given lens region 505. This configuration advantageously increases the size of eye boxes 710. An increased eye box permits greater lateral movement of eyes 120 from which light images 255 can still be viewed. Because the same light image is delivered to the eye from multiple locations, image lenses 530A or 530B should be configured to virtually position the light images substantially at infinity. Positioning the light images at or near infinity results in collimated light images, which reduce the likelihood that the eye will see dual images (i.e., the same virtual object simultaneously originating from multiple different directions).

Figure 7B:
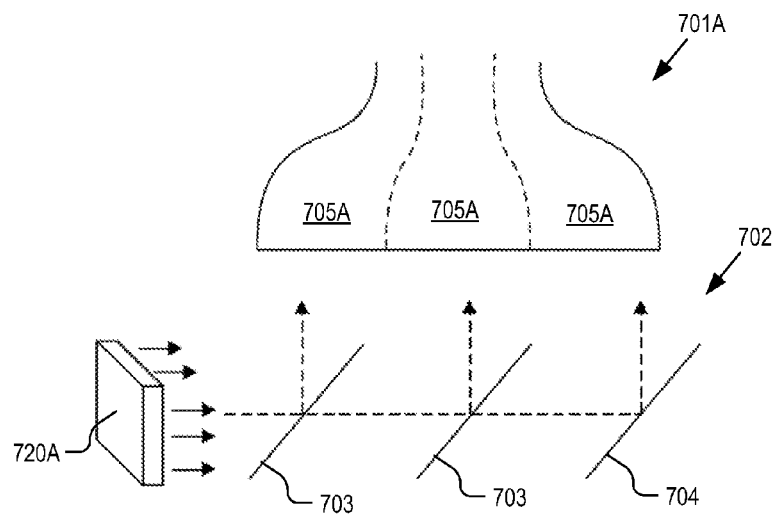
FIG. 7B is a functional block diagram illustrating the in-coupling side of a multi-split fused fiber bundle of a near-to-eye optical system, in accordance with an embodiment of the invention.

Another difference between HMD 500 and HMD 700 is that image sources 720A and 720B are each capable of generating light image replicas for launching into each fused fiber bundle 705A or 705B, respectively. In one embodiment, three separate image sources may each generate a replicated image that is coupled into a respective fused fiber bundle 705A or 705B. In another embodiment, replication optics are used to make copies of the light image output from a single image source. FIG. 7B is a functional block diagram illustrating the in-coupling side of multi-split fused fiber bundle 701A that uses replication optics 702 to couple three light image copies into three individual fused fiber bundles 705A. The illustrated embodiment of replication optics includes two partially reflective angled mirrors 703 and a reflective angled minor 704 to direct image copies into respective fused fiber bundles 705A. Of course, other image replication optics may be used as well.

While HMD 700 displays light image copies from multiple different locations to a given eye, each eye may be displayed a different or identical light image. Furthermore, although FIGS. 7A and 7B illustrate multi-split fiber bundles 701A and 701B as each including three constituent fused fiber bundles each routed to a different location, it should be appreciated that embodiments using fewer (e.g., two) or more (e.g., four or more) constituent fused fiber bundles may be implemented.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus of a head mounted display, the optical apparatus comprising:
    a fused fiber bundle including an array of fused optical fibers having an in-coupling surface located at a first end for receiving a light image and an out-coupling surface physically facing an eye-ward direction and located at a second end for emitting the light image, wherein the fused fiber bundle is tapered such that the in-coupling surface has a larger surface area than the out-coupling surface to compress the light image and individual fiber diameters within the fused fiber bundle have smaller cross-sections at the out-coupling surface relative to the in-coupling surface;
    an image source for generating the light image, the image source disposed at the first end of the fused fiber bundle and optically aligned with the in-coupling surface to launch the light image into the fused fiber bundle;
    an image lens disposed at the second end of the fused fiber bundle and optically aligned with the out-coupling surface to focus the light image emitted from the second end towards an eye when the head mounted display is worn; and
    a glasses structure, including:
        a lens region positioned to align with the eye of a user when the glasses structure is worn by the user; and an ear member coupled to the lens region and shaped to be supported by an ear of the user when worn by the user, wherein the image source is mounted to the ear member and the fused fiber bundle extends from the image source to a central location within the lens region, the central location aligned with the eye of the user when the glasses structure is worn by the user.

2. The optical apparatus of claim 1, wherein the in-coupling surface of the fused fiber bundle substantially matches in size and profile shape to an image emission aperture of the image source.

3. The optical apparatus of claim 2, wherein the image emission aperture of the image source is abutted to the in-coupling surface of the fused fiber bundle.

4. The optical apparatus of claim 1, wherein the image lens comprises an electrically controlled variable lens for focusing the light image in a near-to-eye configuration.

5. The optical apparatus of claim 1, wherein each of the fused optical fibers have ion milled rough surface at the out-coupling surface to increase divergence of the light image emitted from the second end.

6. The optical apparatus of claim 1, wherein the fused fiber bundle is routed along a periphery of the lens region before crossing into the lens region to reach the central location.

7. The optical apparatus of claim 6,
wherein the fused fiber bundle is routed along the periphery of the lens region before bending by approximately 90 degrees to cross into the lens region to reach the central location, and
wherein the fused fiber bundle bends by approximately 90 degrees at the central location such that the out-coupling surface faces the eye-ward direction.

8. The optical apparatus of claim 1, further comprising:
a complementary lens disposed opposite to the image lens such that the out-coupling surface of the fused fiber bundle resides between the complementary lens and the image lens, the complementary lens having first optical properties that reverse second optical properties of the image lens.

9. The optical apparatus of claim 1, wherein fused fiber bundle is twisted at an intermediate location between the first and second ends to rotate an orientation of the light image between landscape and portrait orientations.

10. The optical apparatus of claim 1, further comprising:
a plurality of fused fiber bundles including the fused fiber bundle each guiding a copy of the light image into the lens region to emit the copy of the light image from different locations within the lens region to increase an eye box of the head mounted display; and
a plurality of image lenses each aligned with a corresponding out-coupling surface of the plurality of fused fiber bundles, wherein each of the image lenses is configured to position the copy of the light image substantially at infinity.

11. The optical apparatus of claim 10, further comprising:
an image replicator optically coupled to the image source and in-coupling surfaces of the plurality of fused fiber bundles to generate the copies of the light image for coupling into the in-coupling surfaces.

12. The optical apparatus of claim 1, further comprising:
a refractive material zone disposed between the out-coupling surface of the fused fiber bundle and the image lens, the refractive material zone having a refractive index other than air to affect a field of view of the light image upon emission from the out-coupling surface.

13. An optical apparatus of a head mounted display, the optical apparatus comprising:
a fused fiber bundle including an array of fused optical fibers having an in-coupling surface located at a first end for receiving a light image and an out-coupling surface physically facing an eye-ward direction and located at a second end for emitting the light image, wherein the fused fiber bundle is tapered such that the in-coupling surface has a larger surface area than the out-coupling surface to compress the light image and individual fiber diameters within the fused fiber bundle have smaller cross-sections at the out-coupling surface relative to the in-coupling surface;
an image source for generating the light image, the image source disposed at the first end of the fused fiber bundle and optically aligned with the in-coupling surface to launch the light image into the fused fiber bundle;
an image lens disposed at the second end of the fused fiber bundle and optically aligned with the out-coupling surface to focus the light image emitted from the second end towards an eye when the head mounted display is worn;
a refractive material zone disposed between the out-coupling surface of the fused fiber bundle and the image lens, the refractive material zone having a refractive index other than air to affect a field of view of the light image upon emission from the out-coupling surface, wherein the refractive material zone comprises a material having an electro-actively controlled index of refraction; and
a controller coupled to the refractive material zone to electro-actively control the refractive index of the refractive material zone.

14. A head mounted display comprising:
a pair of optical systems each including:
a fused fiber bundle including an array of fused optical fibers having an in-coupling surface located at a first end for receiving a light image and an out-coupling surface locating at a second end for emitting the light image, wherein the fused fiber bundle is tapered such that the in-coupling surface has a larger surface area than the out-coupling surface;
an image lens disposed at the second end of the fused fiber bundle and optically aligned with the out-coupling surface to focus the light image emitted from the second end; and
an image source for generating the light image and disposed at the first end of the fused fiber bundle and optically aligned with the in-coupling surface to launch the light image into the fused fiber bundle; and
a frame assembly to support the pair of optical systems for wearing on a head of a user, wherein each fused fiber bundle extends from a corresponding image source to a location aligned with a corresponding eye of the user and bends at the location such that the out-coupling surface of each of the optical systems physically faces an eye-ward direction when the head mounted display is worn by the user.

15. The head mounted display of claim 14, wherein the frame assembly comprises:
lens regions each positioned to align with the corresponding eye of the user when worn by the user; and
ear members coupled to the lens regions and shaped to be supported by ears of the user when the head mounted display is worn by the user,
wherein each image source is mounted to one of the ear members and each fused fiber bundle extends from the corresponding image source to the location within one of the lens regions, the location aligned with the corresponding eye of the user when the head mounted display is worn by the user.

16. The head mounted display of claim 15, wherein each fused fiber bundle is routed along a periphery of a corresponding lens region before crossing into the corresponding lens region to reach the location.

17. The head mounted display of claim 16,
wherein each fused fiber bundle is routed along the periphery of the corresponding lens region before bending by approximately 90 degrees to cross into the corresponding lens region to reach the location, and
wherein each fused fiber bundle bends by approximately 90 degrees at the location such that the out-coupling surface faces the eye-ward direction.

18. The head mounted display of claim 17, wherein each of the pair of optical systems further comprises:
a complementary lens disposed opposite to the image lens such that the out-coupling surface of the fused fiber bundle resides between the complementary lens and the image lens, the complementary lens having first optical properties that reverse second optical properties of the image lens to reduce a blind spot size associated with the image lens.

19. The head mounted display of claim 14, wherein each fused fiber bundle bends by approximately 90 degrees at the location such that the out-coupling surface faces the eye-ward direction.

20. A head mounted display comprising:
an optical system including:
a fused fiber bundle including an array of fused optical fibers having an in-coupling surface located at a first end for receiving a light image and an out-coupling surface locating at a second end for emitting the light image, wherein the fused fiber bundle is tapered such that the in-coupling surface has a larger surface area than the out-coupling surface;
an image lens disposed at the second end of the fused fiber bundle and optically aligned with the out-coupling surface to focus the light image emitted from the second end; and
an image source for generating the light image and disposed at the first end of the fused fiber bundle and optically aligned with the in-coupling surface to launch the light image into the fused fiber bundle; and
a frame assembly to support the optical system for wearing on a head of a user such that the out-coupling surface of the optical system physically faces an eye-ward direction when the head mounted display is worn by the user,
wherein the optical system further comprises:
a plurality of fused fiber bundles including the fused fiber bundle each guiding a copy of the light image into a lens region aligned with an eye of the user when the head mounted display is worn by the user to emit the copy of the light image from different locations within the lens region to increase an eye box of the head mounted display; and
a plurality of image lenses each aligned with a corresponding out-coupling surface of the plurality of fused fiber bundles.

* * * * *